(12) United States Patent
Bailey

(10) Patent No.: US 6,692,207 B1
(45) Date of Patent: Feb. 17, 2004

(54) ONE-PIECE METALLIC THREADED INSERT

(75) Inventor: Timothy A. Bailey, New Hope, PA (US)

(73) Assignee: Yardley Products Corp., Yardley, PA (US)

(*) Notice: Subject to any disclaimer, the term of this patent is extended or adjusted under 35 U.S.C. 154(b) by 0 days.

(21) Appl. No.: 10/235,692

(22) Filed: Sep. 5, 2002

(51) Int. Cl.$^7$ ................................................ F16B 35/04
(52) U.S. Cl. ........................ 411/180; 411/453; 411/455
(58) Field of Search ........................... 411/82, 176, 180, 411/451.5, 453, 455, 930

(56) References Cited

U.S. PATENT DOCUMENTS

| | | | |
|---|---|---|---|
| 2,472,569 A | * | 6/1949 | Caldwell et al. ............ 285/210 |
| 2,815,058 A | | 12/1957 | Neuschotz |
| 2,855,970 A | | 10/1958 | Neuschotz |
| 2,958,358 A | | 11/1960 | Neuschotz |
| 3,039,508 A | | 6/1962 | Greene |
| 3,103,962 A | | 9/1963 | Neuschotz |
| 3,105,535 A | | 10/1963 | Czarnowski |
| 3,233,645 A | | 2/1966 | Neuschotz |
| 3,249,141 A | | 5/1966 | Neuschotz |
| 3,270,792 A | | 9/1966 | Neuschotz et al. |
| 3,319,688 A | | 5/1967 | Rosan et al. |
| 3,346,031 A | | 10/1967 | Neuschotz |
| 3,371,697 A | | 3/1968 | James |
| 3,404,717 A | | 10/1968 | Rosan et al. |
| 3,415,301 A | | 12/1968 | Neuschotz |
| 3,421,564 A | | 1/1969 | Neuschotz |
| 3,472,302 A | | 10/1969 | Rosan, Sr. et al. |
| 3,498,353 A | * | 3/1970 | Barry ........................ 411/180 |
| 3,513,896 A | | 5/1970 | Neuschotz |
| 3,616,829 A | | 11/1971 | Runton |
| 3,650,309 A | | 3/1972 | Neuschotz |
| 3,667,526 A | | 6/1972 | Neuschotz |
| 3,834,438 A | | 9/1974 | Ziaylek, Jr. |
| 4,003,287 A | | 1/1977 | Ziaylek, Jr. |
| 4,143,579 A | | 3/1979 | Ziaylek, Jr. |
| 4,288,189 A | | 9/1981 | Ziaylek, Jr. |
| 4,307,986 A | | 12/1981 | Barnsdale |
| 4,405,273 A | | 9/1983 | Ruhl et al. |
| 4,645,394 A | | 2/1987 | While et al. |
| D289,374 S | | 4/1987 | Ziaylek, Jr. |
| 4,767,249 A | | 8/1988 | Elcock et al. |
| D298,605 S | | 11/1988 | Colgan et al. |
| 4,815,907 A | | 3/1989 | Williamson et al. |
| 4,842,462 A | | 6/1989 | Tildesley |
| 4,895,485 A | | 1/1990 | Guevara et al. |
| 4,962,806 A | | 10/1990 | Nottelmann et al. |
| 5,028,189 A | | 7/1991 | Harley |
| 5,131,795 A | | 7/1992 | Kobusch |
| 5,209,888 A | | 5/1993 | Shimada et al. |
| 5,246,322 A | | 9/1993 | Salice |
| 5,263,804 A | * | 11/1993 | Ernst et al. ................... 411/82 |
| 5,411,357 A | | 5/1995 | Viscio et al. |
| D371,294 S | | 7/1996 | Anquetin |
| 5,653,563 A | * | 8/1997 | Ernst et al. ................... 411/82 |
| 5,865,581 A | | 2/1999 | Sadri et al. |
| 6,079,921 A | | 6/2000 | Gauthier et al. |

* cited by examiner

*Primary Examiner*—Gary S. Hartmann
(74) *Attorney, Agent, or Firm*—Sperry, Zoda & Kane

(57) ABSTRACT

A threaded insert including a main body being generally cylindrical with a central bore extending therethrough having outer ring members with knurling in opposed directions for preventing rotation after implanting of the insert into a carrier substrate. The main body includes upper pilot ribs positioned on the outer surface of the main body adjacent the upper end to facilitate entry of that end into the carrier substrate during implanting thereof. The rib includes an upper leading surface which is arcuate to facilitate this insertion by facilitating movement of the substrate material during insertion. A lower pilot rib configuration is also included to allow insertion of the one-piece metallic threaded insert with either the upper or lower end entering the carrier substrate first. Thus the device is preferably multi directional in that it allows insertion of the insert with either end first into the carrier substrate which greatly facilitates mechanized or automatic implanting methods wherein orientation of the metal insert with one of two specific ends always oriented in a downward direction and inserted first is not necessary due to the configuration of this design.

21 Claims, 1 Drawing Sheet

ONE-PIECE METALLIC THREADED INSERT

BACKGROUND OF THE INVENTION

1. Field of the Invention

The present invention deals with the field of inserts which are formed of a material normally harder than the material of the carrier substrate. These inserts are designed for placement into the carrier substrate to provide a location of attachment of various devices secured with respect to the internal threads defined inside the insert. Normally this type of insert is used in most situations where the carrier base material is not the type of material that would form a long term means of securement due to the softness of the material itself. Thus the present invention provides a hardened insert for placement into the softer material providing a more reliable and longer lasting means of securement. Such inserts can be utilized when placement into rubber, wooden or other thin metallic materials but is most preferably used placed into thermoplastic materials to provide a means of securement thereto.

2. Description of the Prior Art

Numerous devices have been designed for providing metallic inserts which can be placed into a carrier substrate and have been patented such as U.S. Pat. No. 2,815,058 patented Dec. 3, 1957 to R. Neuschotz on a "Split Sleeve Type Locking Insert With Inwardly Deformed Thread And Longitudinal Key"; and U.S. Pat. No. 2,855,970 patented Oct. 14, 1958 to R. Neuschotz on an "Insert Having Frictionally Retained Key Which Upsets Threads Of Base Member"; and U.S. Pat. No. 2,958,358 patented Nov. 1, 1960 to R. Neuschotz on a "Threaded Element With U-Shaped Locking Key"; and U.S. Pat. No. 3,039,508 patented to W. E. Greene on Jun. 19, 1962 on a "Wedge Locked Insert"; and U.S. Pat. No. 3,103,962 patented Sep. 17, 1963 to R. A. Neuschotz on a "Self-Locking Threaded Insert"; and U.S. Pat. No. 3,105,535 patented Oct. 1, 1963 to M. S. Czarnowski and assigned to Illinois Tool Works, Inc. on an "Insert Fastener"; and U.S. Pat. No. 3,233,645 patented Feb. 8, 1966 to R. Neuschotz on "Self-Aligning Inserts"; and U.S. Pat. No. 3,249,141 patented May 3, 1966 to R. Neuschotz on a "Deformed Locking Thread With Relieved Areas"; and U.S. Pat. No. 3,270,792 patented Sep. 6, 1966 to R. Neuschotz et al and assigned to Newton Insert Company on a "Threaded Element With Carrier Part Deforming Locking Key"; and U.S. Pat. No. 3,319,688 patented May 16, 1967 to J. Rosan et al and assigned to Rosan Engineering Corp. on an "Insert Having Hollow Locking Pins"; and U.S. Pat. No. 3,346,031 patented Oct. 10, 1967 to R. Neuschotz on "Threaded Elements And Locking Keys Therefor"; and U.S. Pat. No. 3,371,697 patented Mar. 5, 1968 to C. E. James and assigned to Newton Insert Co. on "Threaded Elements With Locking Keys"; and U.S. Pat. No. 3,404,717 patented Oct. 8, 1968 to J. Rosan et al on a "Locking Pin With Cap"; and U.S. Pat. No. 3,415,301 patented Dec. 10, 1968 to R. Neuschotz on "Self-Aligning Threaded Elements"; and U.S. Pat. No. 3,421,564 patented Jan. 14, 1969 to R. Neuschotz on a "Self-Aligning Threaded Fastener"; and U.S. Pat. No. 3,472,302 patented Oct. 14, 1969 to J. Rosan, Sr., et al on an "Insert With Prism Lock Pin"; and U.S. Pat. No. 3,513,896 patented May 26, 1970 to R. Neuschotz on "Threaded Fasteners Having Flanges"; and U.S. Pat. No. 3,616,829 patented Nov. 2, 1971 to L. A. Runton and assigned to Philips Screw Company on a "Hard Metal Insert For Soft Metal Bodies"; and U.S. Pat. No. 3,650,309 patented Mar. 21, 1972 to R. Neuschotz on "Structure And Use Of Fasteners Having Locking Keys"; and U.S. Pat. No. 3,667,526 patented Jun. 6, 1972 to R. Neuschotz on "Fasteners Having Locking Keys"; and U.S. Pat. No. 3,834,438 patented to T. Ziaylek, Jr. and assigned to Yardley Products on Sep. 10, 1974 on "Ultrasonic Inserts"; and U.S. Pat. No. 4,003,287 patented to T. Ziaylek, Jr. on Jan. 18, 1977 and assigned to Yardley Products Corporation on an "Insert Of The Self-Tapping Fluted Type"; and U.S. Pat. No. 4,143,579 patented Mar. 13, 1979 to T. Ziaylek, Jr. and assigned to Yardley Products Corporation on a "Metal Insert"; and U.S. Pat. No. 4,288,189 patented Sep. 8, 1981 to T. Ziaylek, Jr. and assigned to Yardley Products Corp. on a "Threaded Insert"; and U.S. Pat. No. 4,307,986 patented Dec. 29, 1981 to A. D. Barnsdale on "Inserts"; and U.S. Pat. No. 4,405,273 patented Sep. 20, 1983 to J. H. Ruhl et al and assigned to Huck Manufacturing Company on "Blind Fasteners"; and U.S. Pat. No. 4,645,394 patented Feb. 24, 1987 to D. M. While et al and assigned to LTV Aerospace And Defense Company on a "Fastener Apparatus"; and U.S. Des. Pat. No. Des.289,374 patented Apr. 21, 1987 to T. ziaylek, Jr. and assigned to Yardley Products Corp. on an "Insert"; and U.S. Pat. No. 4,767,249 patented Aug. 30, 1988 to R. W. Elcock et al and assigned to Rexnord Inc. on a "Self-Broaching Key"; and U.S. Des. Pat. No. Des.298,605 patented Nov. 22, 1988 to W. L. Colgan et al and assigned to Rexnord Inc. on an "Insert For Securing Fastening Devices"; and U.S. Pat. No. 4,815,907 patented Mar. 28, 1989 to H. L. Williamson et al and assigned to Hi-Shear Corporation on a "Fastener For Structures Made Of Composite Materials"; and U.S. Pat. No. 4,842,462 patented Jun. 27, 1989 to J. M. G. Tildesley and assigned to P.S.M. Fasteners Limited on "Diecast Screwthreaded Inserts And Method Of Making Them"; and U.S. Pat. No. 4,895,485 patented to B. A. Guevara et al on Jan. 23, 1990 and assigned to Rexnord Holdings Inc. on a "Locking Key For Threaded Insert"; and U.S. Pat. No. 4,962,806 patented Oct. 16, 1990 to D. A. Nottelmann et al and assigned to Textro, Inc. on a "Method Of Producing Non-Corrosive Headed Composite Fasteners"; and U.S. Pat. No. 5,028,189 patented Jul. 2, 1991 to D. N. Harley and assigned to Titus Tool Company Limited on an "Adjustable Fixing Device"; and U.S. Pat. No. 5,131,795 patented Jul. 21, 1992 to K. Kobusch and assigned to Bollhoff & Co. GmbH & Co. KG on a "Screw Threaded Insert"; and U.S. Pat. No. 5,209,888 patented May 11, 1993 to S. Shumada et al and assigned to Fukuvi Chemical Industry Co., Ltd. on a "Method For Producing FRP Screw-Like Fastening Elements"; and U.S. Pat. No. 5,246,322 patented Sep. 21, 1993 to L. Salice and assigned to Arturo Salice S.p.A. on a "Fastening Element Comprising A Dowel-Shaped Sleeve"; and U.S. Pat. No. 5,411,357 patented May 2, 1995 to D. P. Viscio et al and assigned to Emhart Inc. on a "Screw Thread Locking Insert"; and U.S. Des. Pat. No. Des.371,294 patented Jul. 2, 1996 to R. P. Anquetin and assigned to Black & Decker Inc. on a "Wall Plug"; and U.S. Pat. No. 5,865,581 patented Feb. 2, 1999 to S. M. Sadri et al and assigned to Huck International, Inc. on a "Free Running Prevailing Torque Nut"; and U.S. Pat. No. 6,079,921 patented to A. Gauthier et al on Jun. 27, 2000 and assigned to Societe de Prospection et d'Inventions Techniques Spit on an "Anchor Bolt For Friable Material".

SUMMARY OF THE INVENTION

The present invention provides a one-piece metallic threaded insert fixedly positionable into a carrier substrate to facilitate securement with respect thereto. The insert includes a main body which is generally of a cylindrical shape which defines a central bore extending axially therethrough. This central bore will preferably define interior threading therealong to facilitate affixing of a threaded member with respect to the substrate by securement thereof to the one-piece metallic insert which itself is secured fixedly with respect to the carrier substrate.

The main body of the insert preferably includes a central axis extending axially through the central bore. The main body also defines an outer surface facing outwardly therearound and an inward surface within the central bore thereof. The main body defines an upper end and a lower end with the central bore extending axially therearound.

A plurality of outer ring members are included located on the outer surface of the main body which extend outwardly therefrom and therearound. These outer ring members include knurling sections thereon to facilitate securement of the main body with respect to the carrier substrate responsive to insertion of the insert therewithin. The outer ring members define one or more outer annular slots therebetween to allow the carrier substrate material to migrate thereinto to further facilitate securement of the main body with respect to the carrier substrate. These outer ring members are preferably positioned extending laterally in a direction approximately perpendicular with respect to the central axis of the main body. The knurling sections preferably include a first knurling section extending helically about a portion of the outer ring members and a second knurling section extending helically around a portion of the outer ring members in a direction opposite with respect to the first knurling section in order to enhance the preventing of rotational movement of the one-piece metallic threaded insert axially about the central axis thereof responsive to the carrier substrate when positioned inserted therewithin.

The present invention further includes an upper pilot rib construction which is positioned on the outer surface of the main body adjacent the upper end thereof to facilitate placement into the carrier substrate during implanting of the one-piece metallic threaded insert thereinto. The upper pilot rib defines an upper leading surface which is arcuate for further facilitating insertion of the one-piece metallic threaded insert into the carrier substrate with the upper end being inserted initially. The upper pilot rib and the outer ring members extend outwardly laterally from the outer surface of the main body preferably to an equal distance therefrom. The upper pilot rib will preferably include a first upper pilot rib member positioned on the outer surface of the main body adjacent the upper end thereof to facilitate placement thereof into the carrier substrate during implanting of the one-piece metallic threaded insert thereinto. The first upper pilot rib member preferably defines a first upper leading surface which is circularly arcuate in cross section for facilitating initial insertion of the one-piece metallic threaded insert into the carrier substrate with the upper end being inserted initially. The first pilot rib member preferably also defines a first upper flat backing surface extending from the first upper leading surface toward the main body to facilitate retaining of the threaded insert in the carrier substrate by preventing removal therefrom axially responsive to insertion thereof with the upper end inserted firstly.

Similarly a second upper pilot rib member may be positioned on the outer surface of the main body between the first upper pilot rib member and the outer ring members extending therearound to further facilitate placement thereof into the carrier substrate during implanting of the insert thereinto. The second upper pilot rib member preferably defines a second upper leading surface which is circularly arcuate in cross section for further facilitating initial insertion of the insert into the carrier substrate with the upper end inserted initially. The second upper pilot rib member preferably includes a second upper flat backing surface extending from the second upper leading surface toward the main body to facilitate retaining of the one-piece metallic threaded insert in the carrier substrate by preventing removal thereof axially responsive to insertion thereof with the upper end first.

In certain embodiments a lower pilot rib construction will also be included positioned on the outer surface of the main body adjacent the lower end thereof to facilitate placement into the carrier substrate during implanting of the insert. The lower rib construction will preferably include a lower leading surface which is arcuate to further facilitate insertion of the insert into the carrier substrate. The lower pilot rib construction preferably will include a first lower pilot rib member positioned on the outer surface of the main body adjacent the lower end thereof to facilitate placement thereof into the carrier substrate during implanting of the insert thereinto. The first lower pilot rib member will define a first lower leading surface in certain embodiments of the present invention which is circularly arcuate in cross section for further facilitating initial insertion of the insert into the carrier substrate with the lower end first. The first lower pilot rib member further will define preferably a first lower flat backing surface extending from the first lower leading surface toward the main body to facilitate retaining of the one-piece metallic threaded insert in the carrier substrate by preventing removal thereof axially responsive to insertion thereof with the lower end first.

Additionally a second lower pilot rib member will preferably be included positioned on the outer surface of the main body between the first lower pilot rib member and the outer ring members extending therearound to further facilitate insertion of the metallic insert into the carrier substrate. This second lower pilot rib member preferably will include a second lower leading surface which is circularly arcuate in cross section for further facilitating initial insertion of the one-piece metallic threaded insert into the carrier substrate with the lower end inserted firstly. The second lower pilot rib member preferably will define a second lower flat backing surface extending from the second lower leading surface toward the main body to facilitate retaining of the one-piece metallic threaded insert in the carrier substrate by preventing removal therefrom axially.

The main body in combination with the outer ring members as well as the upper and lower pilot rib members will have structural mirror image symmetry preferably taken about a plane extending through the center of the one-piece metallic threaded insert oriented perpendicularly with respect to the central axis of the insert itself. In this manner insertion of the threaded insert in either direction with either the upper or lower end extending into the carrier substrate initially it is possible. The capability of implanting an insert with either end leading is a prime advantage especially when utilizing automated system for insertion.

It is an object of the one-piece metallic threaded insert of the present invention wherein inserting into the carrier substrate is greatly facilitated.

It is an object of the one-piece metallic threaded insert of the present invention wherein usage with an insert of a metallic material is significantly enhanced.

It is an object of the one-piece metallic threaded insert of the present invention wherein various different sizes of internal threaded zones can be defined for attaching various items with respect to the substrate.

It is an object of the one-piece metallic threaded insert of the present invention wherein usage with softer substrates such as thermoplastic materials which do not hold threading or hold any type of attachment device thereto very easily is particularly usable.

It is an object of the one-piece metallic threaded insert of the present invention wherein securement between the threaded insert itself and the molded base material such as plastic is greatly enhanced.

It is an object of the one-piece metallic threaded insert of the present invention wherein the threaded insert can be affixed securely with respect to the carrier substrate which may be formed as a molded part.

It is an object of the one-piece metallic threaded insert of the present invention wherein the insert may be inserted into the molded base material at the time of molding thereof.

It is an object of the one-piece metallic threaded insert of the present invention wherein the insert itself is a mirror image about the center plane thereof.

It is an object of the one-piece metallic threaded insert of the present invention wherein insertion of the metallic insert with either open end first is made possible due to the unique construction of the insertion ribs of this invention.

It is an object of the one-piece metallic threaded insert of the present invention wherein cost of manufacture is minimized.

It is an object of the one-piece metallic threaded insert of the present invention wherein maintenance requirements are minimized.

It is an object of the one-piece metallic threaded insert of the present invention wherein initial capital outlay for equipment is minimized.

It is an object of the one-piece metallic threaded insert of the present invention wherein various different types of metal can be used for the insert itself.

It is an object of the one-piece metallic threaded insert of the present invention wherein different sizing of central bores and threaded sections therein can be defined for various purposes.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 2:
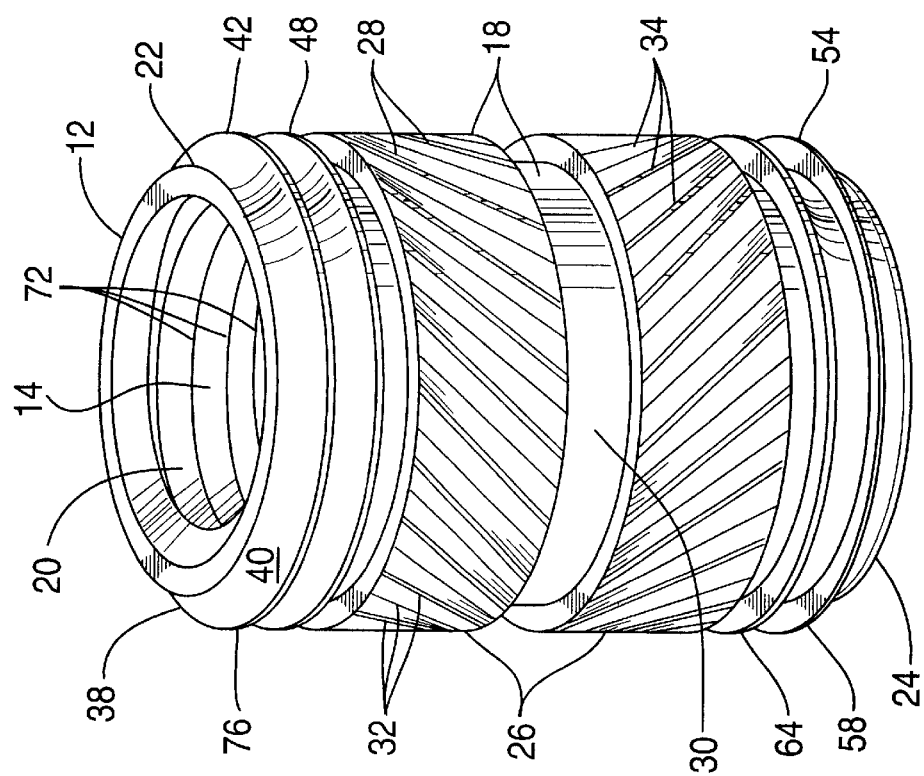
FIG. 2 is a front perspective illustration thereof.

The present invention provides a threaded metallic insert made of a single integral piece which is designed to be inserted into a carrier substrate 10. Such a substrate normally is a softer material requiring a means of attachment therein having a hardness greater than the hardness of the basic material thus providing a need for a threaded insert at various locations wherein attachment to the carrier substrate 10 is needed.

The insert of the present invention preferably includes a main body 12 which is generally of a cylindrical shape with a central bore 14 extending axially therethrough. The central bore 14 and the cylindrical main body 12 define a central axis 16 extending axially therethrough. Main body 12 includes an outer surface 18 which is preferably a cylindrical shape as well as an internal surface 20 defined within the central bore 14 thereof.

Main body 12 preferably includes an upper end 22 and a lower end 24 defined at each opposite opening of the central bore 14. A plurality of outer ring members 26 can be positioned on the outer surface 18 of the main body 12 to extend outwardly therefrom. Preferably these outer ring members 26 will include a knurling means 28 thereon. Such a knurling means has a tendency to dig into the material of the carrier substrate 10 during implanting of the insert and thereby preventing rotation of the insert relative to the carrier substrate 10. Knurling 28 preferably includes a first knurling section 32 extending helically in the first direction and a second knurling section 34 extending helically in an opposite direction. In this manner the knurling 28 taken in combination with the two sections having different directions 32 and 34 will prevent rotation of the insert relative to the carrier substrate 10 in either direction rotationally.

The outer ring members 26 preferably define one or more outer annular slots 30 therebetween. These slots can provide the purpose of receiving some of the thermoplastic or softer materials during insertion of the insert into carrier substrates 10 made of softer material to further facilitate affixing relative thereto.

The present invention preferably includes an upper pilot rib means 38 extending about the outer surface 18 of the main body 12 adjacent the upper end 22 thereof. Similarly the insert can preferably define a lower pilot rib means 54 positioned adjacent the lower end 24 of the outer surface 18 of main body 12 of the insert.

The upper pilot rib configuration 38 preferably includes an upper leading surface 40 which is somewhat arcuate to facilitate insertion of the insert into the carrier substrate 10 with the upper end 22 thereof inserted firstly. In a similar manner the lower pilot rib configuration 54 can include a lower leading surface such as an arcuate surface 56 to facilitate insertion of the insert into the carrier substrate 12 with the lower end 24 being firstly inserted. In this manner the upper pilot rib 38 and the lower pilot rib 54 will provide the capability of implanting the insert in either opposite direction relative to the carrier substrate 10. Thus orientation of the insert prior to implanting in the carrier substrate 10 is not necessary which greatly facilitates automated placement thereof such as by robotic or other mechanical equipment.

The upper rib configuration 38 preferably will include a first upper pilot rib member 42 and a second upper pilot rib member 48. First upper pilot rib member 42 is positioned adjacent to the upper end 22 and includes a first upper leading surface 44 which is preferably arcuate and a first upper flat backing surface 46 which is preferably flat. The second upper pilot rib member 48 is positioned between the first upper pilot rib member 42 and the outer ring member 26 at a position spaced from the upper end 22. Second upper pilot rib member 48 preferably includes a second upper leading surface 50 which is preferably arcuate or circular as well as a second upper flat backing surface 52 which is preferably flat or horizontally extending. In this manner the configuration of the upper pilot rib 38 having both the first upper pilot rib member 42 and the second upper pilot rib member 48 oriented similarly will greatly facilitate placement of the insert into the carrier substrate 10 with the upper end 22 thereof inserted first.

A similar construction will be included adjacent to the lower end 24 of the insert which is defined as the lower pilot rib 54. Lower pilot rib 54 preferably includes a first lower pilot rib member 58 and a second lower pilot rib member 64. First lower pilot rib member 58 is preferably positioned on the outer surface 18 of the main body 12 immediately adjacent to the lower end 24 thereof. First lower pilot member rib member 58 preferably includes a first lower leading surface 60 which is preferably arcuate when taken in a cross section relative to the central axis 16. First lower pilot rib member 58 also includes a first lower flat backing surface 62 extending horizontally outwardly from the outer surface 18 of the main body 12. The lower pilot rib configuration 54 will preferably include a second lower pilot rib member 64 which itself includes a second lower leading surface 66 being preferably arcuate as well as a second upper flat backing surface 52 which is preferably flat. The combination of the first lower leading surface 60 and the second lower leading surface 66 will greatly facilitate placement of the insert with the lower pilot rib moving firstly into the carrier substrate 10. The combination of the first lower flat backing surface 62 and the second lower flat backing surface 68 will greatly facilitate holding of the insert in the carrier substrate 10 and will facilitate preventing separation therebetween axially.

The contour of the upper leading surface 40, in particular the first upper leading surface 44 and the second upper leading surface 50 as well as the lower leading surface 56 and in particular the first lower leading surface 60 and the second lower leading surface 66, is an important consideration of the present invention. As shown best in the side cross sectional view in FIG. 1 these arcuate contours will preferably be arcuate in the direction extending parallel to the central axis 16 as shown by the radius of curvature arrow 70. The radius of curvature for these arcuate leading edges will preferably be approximately one-half inch. However they can be any size but when utilizing an insert of approximately one-half inch in length the radius of curvature of these leading edges will be approximately one-half inch in radius of curvature. The present invention however is not deemed to be limited by this dimension in any manner whatsoever. This is only shown as an example for the embodiment disclosed herein.

The main body 12 will define the central bore 14 with interior thread means 72 positioned therein. These threads are shown best in FIG. 1 and can be chosen of any dimension, pitch or angle. These threads can provide a means for attachment of a threaded member relative to the softer material of carrier substrate 10 at various locations and of many different sizes, shapes and overall configurations.

Figure 1:
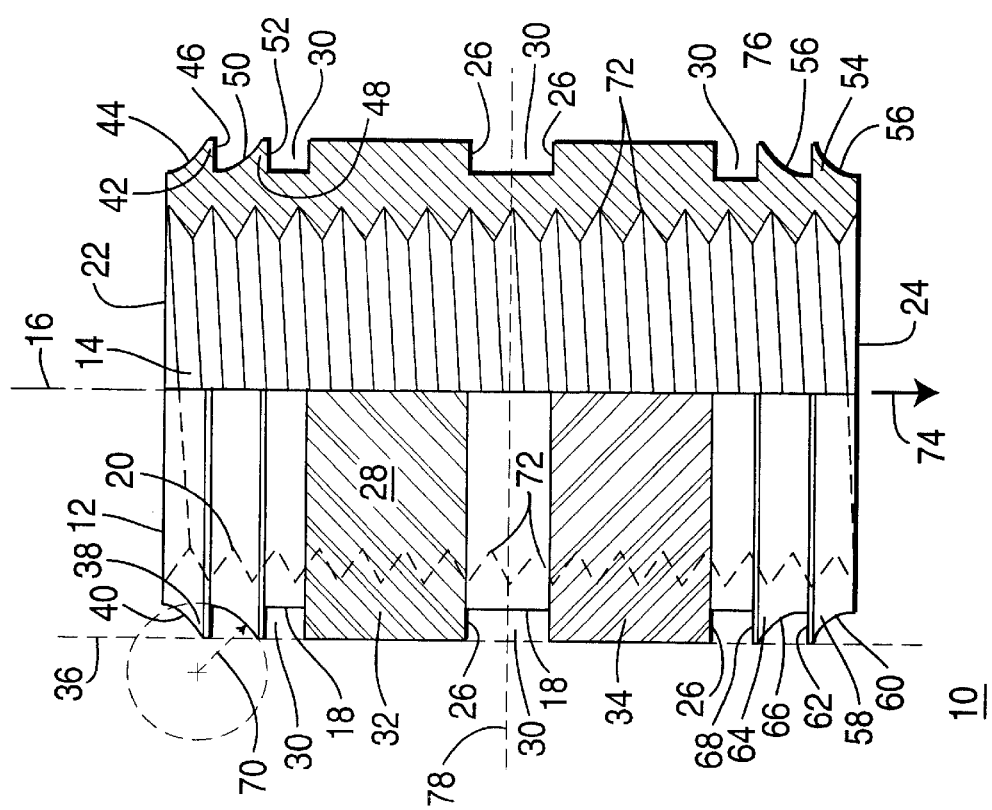
FIG. 1 is a side cross-sectional view of an embodiment of the one-piece metallic threaded insert of the present invention.

As shown in FIG. 1 the insert will be implanted in the insertion direction 74 extending downwardly. With this direction it is important to note that, as shown in FIG. 1, the lower leading surfaces 56 will cause the material of the carrier substrate 10 to spread outwardly to some extent. This gradual outward spread achieved by the unique shape of the leading surfaces 56 is an important characteristic of the present invention. Another important characteristic is the overall diameter of the individual pilot ribs 38 or 54. As shown in this drawing the lateral dimension of the pilot ribs is at least as large in diameter as the diameter of the outer ring members 26. This is shown best by viewing measurement line 36 which is described herein as an equal extending distance line showing that the tip of the ribs extending outwardly is approximately equal to the laterally extending surfaces of the ribs. More particularly the outwardly extending point 76 of the edge of the ribs where the leading surface meets the flat backing surface is approximately equal in the outwardly extending distance from the central axis 16 as the diameter of the outer ring members 26. In this manner the separation of the material of the carrier substrate 10 to allow the insert to be implanted therein if greatly facilitated while still allowing the first and second knurling sections 32 and 34 on the outer ring members 26 to fixedly grip with respect to the surrounding material of the carrier substrate. This gripping is also greatly facilitated by the helically opposed orientation of the knurling on the outer ring members 26.

Also the insert of the present invention preferably provides a mirror image about a plane 78 taken through the middle of the insert oriented horizontally relative to the central axis 16. This mirror image is one of the important aspects which allows the insert of the present invention to be implanted into a carrier substrate 10 with either the upper end 22 or the lower end 24 thereof inserted firstly. This double directional design greatly facilitates use of the present invention with automated robotic equipment.

It should be appreciated that the main body 12 of the present invention can be made with any type of metal and that the carrier substrate 10 can be any substrate which normally however would be softer than the insert. That is, the metal of the insert is chosen such that it is somewhat harder than the material of the carrier substrate 10 in order to provide the advantage of allowing more fixed securement with respect thereto.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A one-piece metallic threaded insert fixedly positionable into a carrier substrate to facilitate securement with respect thereto comprising:

A) a main body being generally cylindrically shaped and defining a central bore defining interior threads therealong and extending axially therethrough, said main body defining a central axis extending axially through said central bore, said main body defining an outer surface outwardly facing therearound and an interior surface within said central bore, said main body defining an upper end and a lower end with said central bore extending axially therebetween;

B) a plurality of outer ring members located on said outer surface of said main body and extending outwardly therefrom and therearound, said outer ring members including a knurled portion thereon to facilitate securement of said main body with respect to the carrier substrate responsive to insertion of the one-piece metallic threaded insert therewithin, said outer ring members defining at least one outer annular slot therebetween to allow said carrier substrate material to migrate thereinto to further facilitate securement of said main body with respect to the carrier substrate;

C) an upper pilot ribbed portion positioned on said outer surface of said main body adjacent said upper end thereof to facilitating placement thereof into the carrier substrate during implanting of the one-piece metallic threaded insert thereinto, said upper pilot ribbed portion defining an upper leading surface which is arcuate for further facilitating insertion of the one-piece metallic threaded insert into the carrier substrate with the upper end being inserted firstly; and D) a lower pilot ribbed portion positioned on said outer surface of said main body adjacent said lower end thereof to facilitating placement thereof into the carrier substrate during implanting of the one-piece metallic threaded insert thereinto, said lower pilot ribbed portion defining a lower leading surface which is arcuate for further facilitating insertion of the one-piece metallic threaded insert into the carrier substrate with the lower end being inserted firstly in order to allow the one-piece metallic threaded insert to be capable of being inserted with said upper end entering first or with said lower end entering first.

2. A one-piece metallic threaded insert fixedly positionable into a carrier substrate to facilitate securement with respect thereto as defined in claim 1 wherein said upper leading surface and said lower leading surface are arcuate along a cross-section view taken extending parallel with respect to said central axis thereof to facilitate imbedding of the one-piece metallic threaded insert into the carrier substrate.

3. A metallic threaded insert fixedly positionable into a carrier substrate to facilitate securement with respect thereto as defined in claim 1 wherein said upper pilot ribbed portion includes:
  A) a first upper pilot rib member positioned on said outer surface of said main body adjacent said upper end thereof to facilitating placement thereof into the carrier substrate during implanting of the one-piece metallic threaded insert thereinto, said first upper pilot rib member defining a first upper leading surface which is arcuate in cross-section for further facilitating initial insertion of the one-piece metallic threaded insert into the carrier substrate with the upper end being inserted firstly; and
  B) a second upper pilot rib member positioned on said outer surface of said main body between said first upper pilot rib member and said outer ring members extending therearound to further facilitate placement thereof into the carrier substrate during implanting of the one-piece metallic threaded insert thereinto, said second upper pilot rib member defining a second upper leading surface which is arcuate in cross-section for further facilitating initial insertion of the one-piece metallic threaded insert into the carrier substrate with the upper end being inserted firstly.

4. A metallic threaded insert fixedly positionable into a carrier substrate to facilitate securement with respect thereto as defined in claim 3 wherein said first upper pilot rib member defines an first upper flat backing surface extending from said first upper leading surface toward said main body to facilitate retaining of the one-piece metallic threaded insert in the carrier substrate by preventing removal thereof axially responsive to insertion thereof with said upper end firstly.

5. A metallic threaded insert fixedly positionable into a carrier substrate to facilitate securement with respect thereto as defined in claim 4 wherein said second upper pilot rib member defines an second upper flat backing surface extending from said second upper leading surface toward said main body to facilitate retaining of the one-piece metallic threaded insert in the carrier substrate by preventing removal thereof axially responsive to insertion thereof with said upper end firstly.

6. A metallic threaded insert fixedly positionable into a carrier substrate to facilitate securement with respect thereto as defined in claim 4 wherein said second lower pilot rib member defines an second lower flat backing surface extending from said second lower leading surface toward said main body to facilitate retaining of the one-piece metallic threaded insert in the carrier substrate by preventing removal thereof axially responsive to insertion thereof with said lower end firstly.

7. A metallic threaded insert fixedly positionable into a carrier substrate to facilitate securement with respect thereto as defined in claim 4 wherein said knurled portion includes a first knurling section extending helically about a portion of said outer ring members and a second knurling section extending helically around a portion of said outer ring members in a direction oppositely oriented with respect to said first knurling section to enhance preventing of rotational movement of the one-piece metallic threaded insert axially about said central axis responsive to the carrier substrate when positioned inserted therewithin.

8. A metallic threaded insert fixedly positionable into a carrier substrate to facilitate securement with respect thereto as defined in claim 3 wherein said first lower pilot rib member defines an first lower flat backing surface extending from said first lower leading surface toward said main body to facilitate retaining of the one-piece metallic threaded insert in the carrier substrate by preventing removal thereof axially responsive to insertion thereof with said lower end firstly.

9. A metallic threaded insert fixedly positionable into a carrier substrate to facilitate securement with respect thereto as defined in claim 1 wherein said upper leading surface of said upper pilot ribbed portion and said lower leading surface of said lower pilot ribbed portion are circularly arcuate in shape.

10. A metallic threaded insert fixedly positionable into a carrier substrate to facilitate securement with respect thereto as defined in claim 9 wherein the radius of curvature of the circular shape of said upper leading surface of said upper pilot ribbed portion and said lower leading surface of said lower pilot ribbed portion has a radius of curvature between 0.25 and 1.00 inches.

11. A metallic threaded insert fixedly positionable into a carrier substrate to facilitate securement with respect thereto as defined in claim 9 wherein the radius of curvature of the circular shape of said upper leading surface of said upper pilot ribbed portion and said lower leading surface of said lower pilot ribbed portion has a radius of curvature of approximately 0.5 inches.

12. A metallic threaded insert fixedly positionable into a carrier substrate to facilitate securement with respect thereto as defined in claim 1 wherein combination of said main body, said outer ring members, said upper pilot ribbed portion and said lower pilot ribbed portion has structural mirror image symmetry taken across a plane extending through the center of the one-piece metallic threaded insert oriented perpendicularly with respect to said central axis.

13. A metallic threaded insert fixedly positionable into a carrier substrate to facilitate securement with respect thereto as defined in claim 1 wherein said upper pilot ribbed portion defines an upper flat backing surface extending from said upper leading surface toward said main body to facilitate retaining of the one-piece metallic threaded insert in the carrier substrate by preventing removal thereof axially responsive to insertion thereof with said upper end firstly.

14. A metallic threaded insert fixedly positionable into a carrier substrate to facilitate securement with respect thereto as defined in claim 1 wherein said lower pilot ribbed portion defines a lower flat backing surface extending from said lower leading surface toward said main body to facilitate retaining of the one-piece metallic threaded insert in the carrier substrate by preventing removal thereof axially responsive to insertion thereof with said lower end firstly.

15. A metallic threaded insert fixedly positionable into a carrier substrate to facilitate securement with respect thereto as defined in claim 1 wherein said central bore is cylindrically shaped.

16. A metallic threaded insert fixedly positionable into a carrier substrate to facilitate securement with respect thereto as defined in claim 1 wherein said outer ring members extend laterally in a direction approximately perpendicularly with respect to said central axis of said main body.

17. A metallic threaded insert fixedly positionable into a carrier substrate to facilitate securement with respect thereto as defined claim 1 wherein said knurled portion is adapted to prevent rotation of the one-piece metallic threaded insert axially about said central axis responsive to the carrier substrate when positioned inserted therewithin.

18. A metallic threaded insert fixedly positionable into a carrier substrate to facilitate securement with respect thereto as defined in claim 1 wherein said lower pilot ribbed portion includes:
  A) a first lower pilot rib member positioned on said outer surface of said main body adjacent said lower end thereof to facilitating placement thereof into the carrier substrate during implanting of the one-piece metallic threaded insert thereinto, said first lower pilot rib member defining a first lower leading surface which is arcuate in cross-section for further facilitating initial insertion of the one-piece metallic threaded insert into the carrier substrate with the lower end being inserted firstly; and
  B) a second lower pilot rib member positioned on said outer surface of said main body between said first lower pilot rib member and said outer ring members extending therearound to further facilitate placement thereof into the carrier substrate during implanting of the one-piece metallic threaded insert thereinto, said second lower pilot rib member defining a second lower leading surface which is arcuate in cross-section for further facilitating initial insertion of the one-piece metallic threaded insert into the carrier substrate with the lower end being inserted firstly.

19. A metallic threaded insert fixedly positionable into a carrier substrate to facilitate securement with respect thereto as defined in claim 1 wherein said upper pilot ribbed portion, said lower pilot ribbed portion and said outer ring members extend outwardly laterally from said outer surface of said main body to an equal distance therefrom.

20. A metallic threaded insert fixedly positionable into a carrier substrate to facilitate securement with respect thereto comprising:
  A) a main body being generally cylindrically shaped and defining a central bore defining interior threads therealong and extending axially therethrough, said main body defining a central axis extending axially through said central bore, said main body defining an outer surface outwardly facing therearound and an interior surface within said central bore, said main body defining an upper end and a lower end with said central bore extending axially therebetween;
  B) a plurality of outer ring members located on said outer surface of said main body and extending outwardly therefrom and therearound, said outer ring members including a knurled portion thereon to facilitate securement of said main body with respect to the carrier substrate responsive to insertion of the one-piece metallic threaded insert therewithin, said outer ring members defining at least one outer annular slot therebetween to allow said carrier substrate material to migrate thereinto to further facilitate securement of said main body with respect to the carrier substrate;
  C) an upper pilot ribbed portion positioned on said outer surface of said main body adjacent said upper end thereof to facilitating placement thereof into the carrier substrate during implanting of the one-piece metallic threaded insert thereinto, said upper pilot ribbed portion defining an upper leading surface which is arcuate for further facilitating insertion of the one-piece metallic threaded insert into the carrier substrate with the upper end being inserted firstly, said upper pilot ribbed portion and said outer ring members extending outwardly laterally from said outer surface of said main body to an equal distance therefrom, said upper pilot ribbed portion including:
    (1) a first upper pilot rib member positioned on said outer surface of said main body adjacent said upper end thereof to facilitating placement thereof into the carrier substrate during implanting of the one-piece metallic threaded insert thereinto, said first upper pilot rib member defining a first upper leading surface which is circularly arcuate in cross-section for further facilitating initial insertion of the one-piece metallic threaded insert into the carrier substrate with the upper end being inserted firstly;
    (2) a second upper pilot rib member positioned on said outer surface of said main body between said first upper pilot rib member and said outer ring members extending therearound to further facilitate placement thereof into the carrier substrate during implanting of the one-piece metallic threaded insert thereinto, said second upper pilot rib member defining a second upper leading surface which is circularly arcuate in cross-section for further facilitating initial insertion of the one-piece metallic threaded insert into the carrier substrate with the upper end being inserted firstly;
  a lower pilot ribbed portion positioned on said outer surface of said main body adjacent said lower end thereof to facilitating placement thereof into the carrier substrate during implanting of the one-piece metallic threaded insert thereinto, said lower pilot ribbed portion defining a lower leading surface which is arcuate for further facilitating insertion of the one-piece metallic threaded insert into the carrier substrate with the lower end being inserted firstly in order to allow the one-piece metallic threaded insert to be capable of being inserted with said upper end entering first or with said lower end entering first, said lower pilot ribbed portion and said outer ring members extending outwardly laterally from said outer surface of said main body to an equal distance therefrom, said lower pilot ribbed portion including:
    (1) a first lower pilot rib member positioned on said outer surface of said main body adjacent said lower end thereof to facilitating placement thereof into the carrier substrate during implanting of the one-piece metallic threaded insert thereinto, said first lower pilot rib member defining a first lower leading surface which is circularly arcuate in cross-section for further facilitating initial insertion of the one-piece metallic threaded insert into the carrier substrate with the lower end being inserted firstly; and
    (2) a second lower pilot rib member positioned on said outer surface of said main body between said first lower pilot rib member and said outer ring members extending therearound to further facilitate placement thereof into the carrier substrate during implanting of the one-piece metallic threaded insert thereinto, said second lower pilot rib member defining a second lower leading surface which is circularly arcuate in cross-section for further facilitating initial insertion of the one-piece metallic threaded insert into the carrier substrate with the lower end being inserted firstly.

21. A metallic threaded insert fixedly positionable into a carrier substrate to facilitate securement with respect thereto comprising:

A) a main body being generally cylindrically shaped and defining a central bore defining interior threads therealong and extending axially therethrough, said main body defining a central axis extending axially through said central bore, said main body defining an outer surface outwardly facing therearound and an interior surface within said central bore, said main body defining an upper end and a lower end with said central bore extending axially therebetween;

B) a plurality of outer ring members located on said outer surface of said main body and extending outwardly therefrom and therearound, said outer ring members including a knurled portion thereon to facilitate securement of said main body with respect to the carrier substrate responsive to insertion of the one-piece metallic threaded insert therewithin, said outer ring members defining at least one outer annular slot therebetween to allow said carrier substrate material to migrate thereinto to further facilitate securement of said main body with respect to the carrier substrate, said outer ring members positioned extending laterally in a direction approximately perpendicularly with respect to said central axis of said main body, said knurled portion including:
   (1) a first knurling section extending helically about a portion of said outer ring members; and
   (2) a second knurling section extending helically around a portion of said outer ring members in a direction oppositely oriented with respect to said first knurling section to enhance preventing of rotational movement of the one-piece metallic threaded insert axially about said central axis responsive to the carrier substrate when positioned inserted therewithin;

C) an upper pilot ribbed portion positioned on said outer surface of said main body adjacent said upper end thereof to facilitating placement thereof into the carrier substrate during implanting of the one-piece metallic threaded insert thereinto, said upper pilot ribbed portion defining an upper leading surface which is arcuate for further facilitating insertion of the one-piece metallic threaded insert into the carrier substrate with the upper end being inserted firstly, said upper pilot ribbed portion and said outer ring members extending outwardly laterally from said outer surface of said main body to an equal distance therefrom, said upper pilot ribbed portion including:
   (1) a first upper pilot rib member positioned on said outer surface of said main body adjacent said upper end thereof to facilitating placement thereof into the carrier substrate during implanting of the one-piece metallic threaded insert thereinto, said first upper pilot rib member defining a first upper leading surface which is circularly arcuate in cross-section for further facilitating initial insertion of the one-piece metallic threaded insert into the carrier substrate with the upper end being inserted firstly, said first upper pilot rib member further defining an first upper flat backing surface extending from said first upper leading surface toward said main body to facilitate retaining of the one-piece metallic threaded insert in the carrier substrate by preventing removal thereof axially responsive to insertion thereof with said upper end firstly;
   (2) a second upper pilot rib member positioned on said outer surface of said main body between said first upper pilot rib member and said outer ring members extending therearound to further facilitate placement thereof into the carrier substrate during implanting of the one-piece metallic threaded insert thereinto, said second upper pilot rib member defining a second upper leading surface which is circularly arcuate in cross-section for further facilitating initial insertion of the one-piece metallic threaded insert into the carrier substrate with the upper end being inserted firstly, said second upper pilot rib member further defining an second upper flat backing surface extending from said second upper leading surface toward said main body to facilitate retaining of the one-piece metallic threaded insert in the carrier substrate by preventing removal thereof axially responsive to insertion thereof with said upper end firstly;

D) a lower pilot ribbed portion positioned on said outer surface of said main body adjacent said lower end thereof to facilitating placement thereof into the carrier substrate during implanting of the one-piece metallic threaded insert thereinto, said lower pilot ribbed portion defining a lower leading surface which is arcuate for further facilitating insertion of the one-piece metallic threaded insert into the carrier substrate with the lower end being inserted firstly in order to allow the one-piece metallic threaded insert to be capable of being inserted with said upper end entering first or with said lower end entering first, said lower pilot ribbed portion and said outer ring members extending outwardly laterally from said outer surface of said main body to an equal distance therefrom, said lower pilot ribbed portion including:
   (1) a first lower pilot rib member positioned on said outer surface of said main body adjacent said lower end thereof to facilitating placement thereof into the carrier substrate during implanting of the one-piece metallic threaded insert thereinto, said first lower pilot rib member defining a first lower leading surface which is circularly arcuate in cross-section for further facilitating initial insertion of the one-piece metallic threaded insert into the carrier substrate with the lower end being inserted firstly, said first lower pilot rib member further defining an first lower flat backing surface extending from said first lower leading surface toward said main body to facilitate retaining of the one-piece metallic threaded insert in the carrier substrate by preventing removal thereof axially responsive to insertion thereof with said lower end firstly; and
   (2) a second lower pilot rib member positioned on said outer surface of said main body between said first lower pilot rib member and said outer ring members extending therearound to further facilitate placement thereof into the carrier substrate during implanting of the one-piece metallic threaded insert thereinto, said second lower pilot rib member defining a second lower leading surface which is circularly arcuate in cross-section for further facilitating initial insertion of the one-piece metallic threaded insert into the carrier substrate with the lower end being inserted firstly, said second lower pilot rib member further defining an second lower flat backing surface extending from said second lower leading surface toward said main body to facilitate retaining of the one-piece metallic threaded insert in the carrier substrate by preventing removal thereof axially responsive to insertion thereof with said lower end firstly;
   wherein the combination of said main body, said outer ring members, said upper pilot ribbed portion and said lower pilot ribbed portion has structural mirror image symmetry taken across a plane extending through the center of the one-piece metallic threaded insert oriented perpendicularly with respect to said central axis.

* * * * *